United States Patent [19]
Taylor et al.

[11] Patent Number: 4,873,895
[45] Date of Patent: Oct. 17, 1989

[54] MANUFACTURE OF ROTARY DRILL BITS

[75] Inventors: Malcolm R. Taylor, Gloucester; John D. Barr, Cheltenham; John R. Smart, Gloucester, all of England

[73] Assignee: Reed Tool Company Limited, Gloucestershire, England

[21] Appl. No.: 265,237

[22] Filed: Oct. 31, 1988

[30] Foreign Application Priority Data

Nov. 3, 1987 [GB] United Kingdom ................. 8725670

[51] Int. Cl.⁴ ......................... B21K 5/02; E21B 10/46
[52] U.S. Cl. ............................................... 76/108 A
[58] Field of Search ............. 76/101 R, 101 E, 108 R, 76/108 A, DIG. 11, DIG. 12

[56] References Cited
U.S. PATENT DOCUMENTS
4,605,157 8/1986 Barr et al. ......................... 76/108 A Primary Examiner—Roscoe V. Parker
Attorney, Agent, or Firm—Browning, Bushman, Zamecki & Anderson

[57] ABSTRACT

There is provided a method of manufacturing a rotary drill bit of the kind including a plurality of cutting structures mounted in sockets in the bit body and projecting from the face of the bit. The method comprises providing a clearance between each cutting structure and its socket and filling the clearance with a settable liquid, the settable liquid being such as to solidify at a temperature less than 400° C. and to retain its integrity, after solidification, at least up to a temperature of 180° C. The solidified liquid acts as a gap filler and provides an interference fit between the cutting structure and the socket. Suitable gap filing settable liquids are: anaerobic adhesive, epoxy resin, dental amalgam, tin/lead solder and bismuth/antimony alloy.

15 Claims, 2 Drawing Sheets

MANUFACTURE OF ROTARY DRILL BITS

BACKGROUND OF THE INVENTION

The invention relates to the manufacture of rotary drill bits for use in drilling or coring holes in subsurface formations.

The invention is applicable to the manufacture of rotary drill bits of the kind comprising a bit body having a shank for connection to a drill string, a bit face on the bit body, a plurality of cutting structures mounted in sockets in the bit body and projecting from the face of the bit, and a number of openings in the face of the bit communicating with a passage in the bit body for supplying drilling fluid to the face of the bit for cooling and/or cleaning the cutting structures.

Each cutting structure may comprise a cutting element bonded, for example by brazing, to a carrier which may be in the form of a stud of steel or tungsten carbide which is received and located in a socket in the bit body. The bit body may be formed, for example, from steel or from a solid infiltrated tungsten carbide matrix.

Usually, the cutting structures are secured within their respective sockets by brazing, press-fitting or shrink-fitting. However these methods have certain disadvantages.

For example, shrink-fitting necessitates the heating of the bit body to enlarge the sockets, followed by subsequent cooling of the body after the cutting structures have been inserted in the sockets. However, it is found that the necessary heating of the bit body can result in distortion of the sockets, for example as a result of stress relief, so that the cutting structures cannot be inserted easily into the sockets even after the bit body has been heated. The bit body may also be subjected to heating by other processes, for example the application of a hard-facing to a steel body, which may also result in distortion of the sockets.

In the case where the cutting structures are secured in the sockets by brazing, the brazing process subjects the bit body and cutting structures to an additional heat cycle. In most cases the cutting structure comprises a cutting element brazed to a stud or post and the bond effected by some brazing alloys may deteriorate as a result of the heating cycle required to braze the stud within the socket, thus weakening the bond between the cutting element and the stud.

In both brazing and shrink-fitting processes, the temperature of the bit body normally requires to be raised to temperatures above 450° C., and at such temperatures the structure of the steel of the bit body begins to change and it begins to lose its tensile strength. This is obviously undesirable.

The present invention sets out to overcome these problems by using a method of securing the cutting structures within their sockets which does not require an elevated temperature, or which requires a temperature which is sufficiently low to avoid distortion of the sockets or deterioration of the bond between the cutting elements and the studs.

SUMMARY OF THE INVENTION

According to the invention there is provided a method of manufacturing a rotary drill bit of the kind comprising bit body having a shank for connection to a drill string, a bit face on the bit body, a plurality of cutting structures mounted in sockets in the bit body and projecting from the face of the bit, and a number of openings in the face of the bit communicating with a passage in the bit body for supplying drilling fluid to the face of the bit, the method including the steps of dimensioning each cutting structure and the socket within which it is to be received to provide a clearance between the cutting structure and the socket, inserting the cutting structure in the socket, filling said clearance with a settable liquid, and then solidifying said liquid, the settable liquid solidifying at a temperature less than 400° C. and retaining its integrity, after solidification, at least up to a temperature of 180° C.

The liquid, when solidified, acts as a gap filler and provides, in effect, an interference fit between the cutting structure and the socket, thereby retaining the cutting structure in the socket. However, since the liquid solidifies at a temperature less than 400° C., which is significantly less than, for example, brazing temperature, the cutting structure and socket are not subjected to significant distortion nor is there risk of deterioration of the bond between the cutting element and the stud. At the same time the gap filler retains its integrity, i.e. does not decompose or melt, at the temperatures to which the drill bit is subjected in normal operation.

It is advantageous if the settable liquid exhibits no shrinkage on solidification and preferably the liquid expands on solidification.

Although the interference fit provided by the solidified liquid may be sufficient alone to retain the cutting structure in the socket in use, the liquid when solidified preferably also adheres to those surfaces of the cutting structures and socket which it contacts.

Examples of suitable gap filling settable liquids are: anaerobic adhesive, epoxy resin, dental amalgam, tin/lead solder or bismuth/antimony alloy. Bismuth/antimony alloy is particularly advantageous for the invention since bismuth expands by 6% on solidification. A suitable alloy comprises 95% bismuth, 5% antimony.

A suitable anaerobic adhesive is a polymerisable ester.

The settable liquid may be of the known kind which is initially liquid at ambient temperatures and which is solidified by curing or chemical reaction. Adhesives are normally of the kind. Alternatively the settable liquid may be a material, such as a solder, which is solid at ambient temperatures, and at least up to a temperature of 180° C., but which is liquid at a higher temperature less than 400° C.

A suitable adhesive is supplied by the Loctite Corporation under the trade name "LOCTITE 620", and details of suitable adhesives are also given in U.S. Pat. Nos. 3,988,299, 3,218,305 and 4,038,475, which are incorporated herein by reference.

Preferably the method includes the further steps of heating the bit body to a temperature below that at which the settable liquid would break down, coating the portions of the cutting structure which are to be received into the sockets, at substantially ambient temperature, with the liquid, introducing the cutting structures into the sockets, and then allowing the bit body to cool to ambient temperature.

Preferably the bit body is heated to a temperature of the same order as the maximum temperature to which the bit will be subjected in normal use, for example about 180° C.

The cutting structures and sockets are preferably so dimensioned that there is a clearance of substantially 0.1 mm between the cutting structure and the socket at ambient temperature.

The bit body may be formed from steel or other machinable metal, the sockets being machined into the bit body, or the bit body may be formed by a powder metallurgy process in which case the sockets may be moulded into the bit body during the powder metallurgy process.

As previously mentioned, each cutting structure may comprise a cutting element bonded to a carrier which is received in an associated socket in the bit body. Each cutting element may comprise a preform of circular or other suitable shape having a thin hard facing layer, which defines the front cutting face of the element, bonded to a less hard backing layer. For example, the hard facing layer may be formed of polycrystalline diamond or other superhard material, and the backing layer may be formed of cemented tungsten carbide. Another form of cutting element comprises a unitary body of thermally stable polycrystalline diamond material.

The invention includes within its scope a rotary drill bit when formed by any of the above-mentioned methods.

DETAILED DESCRIPTION OF THE PREFERRED EMBODIMENTS

Figure 1:
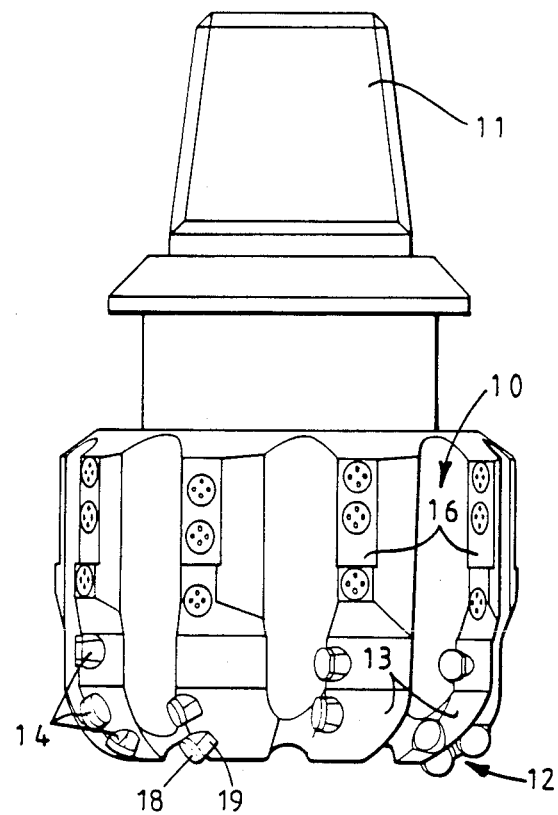
FIG. 1 is a side elevation of a typical drill bit to which the invention may be applied.

The bit body 10 is machined from steel and may be provided with a hard facing to increase its resistance to erosion during drilling. Such hard facing processes are well known and do not form a part of the present invention and will not therefore be described in detail.

The bit body has a threaded shank 11 at one end for connection to the drill string. The operative end face 12 of the bit body is formed with a number of blades 13 radiating from the central area of the bit, and the blades carrying cutting structures 14 spaced apart along the length thereof.

The bit has a gauge section including kickers 16 which contact the walls of the borehole to stabilise the bit in the borehole. A central passage (not shown) in the bit body and shank delivers drilling fluid through nozzles 17 in the end face 12 in known manner.

Figure 2:
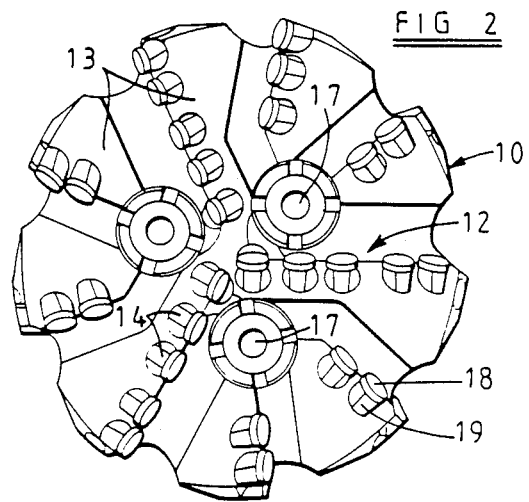
FIG. 2 is an end elevation of the drill bit shown in FIG. 1.
Figure 3:
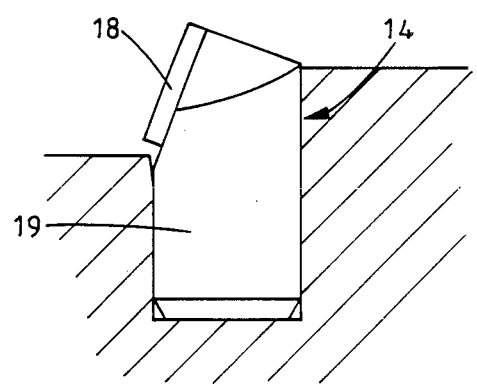
FIG. 3 is a side elevation of a typical cutting structure mounted in a bit body in accordance with the invention.

As shown in FIG. 3, as well as in FIGS. 1 and 2, each cutting structure 14 comprises a preform cutting element 18 mounted on a carrier in the form of a stud 19 which is located in a socket in the bit body.

Each preform cutting element 18 is usually in the form of a tablet of circular or other suitable shape comprising a thin facing layer of polycrystalline diamond bonded to a backing layer of cemented tungsten carbide, both layers being of uniform thickness.

As previously mentioned, the stud of such a cutting structure would normally be secured within its socket by shrink-fitting and/or brazing. In accordance with the present invention, however, the stud is secured within its socket by means of a gap filling settable liquid which solidifies at a temperature less than 400° C., but which retains its integrity at least up to a temperature of 180° C. In a preferred method according to the invention the settable liquid used is an adhesive composition which contains a polymerisable ester and exhibits anaerobic curing characteristics. A suitable adhesive is supplied by Loctite Corporation under the trade name "LOCTITE 620".

The studs and sockets are dimensioned to provide a clearance of 0.1 mm at ambient temperature. The bit body is heated to a temperature of approximately 180° C. which is well below the limitations of the adhesive and close to the maximum temperature which the bit would normally be expected to meet during drilling. At this temperature the sockets increase in size by approximately 0.035 mm. The studs of the cutting structures, at ambient temperature, are then coated with the adhesive and assembled into the sockets, and the bit body is allowed to cool and the adhesive cured.

It has been found that with the above-mentioned clearance of 0.1 mm the adhesive joint strength produced varied from 65.6 to 68.9 kN. A test with a clearance of 0.075 mm gave a joint strength of 63.6 kN. These joint strengths are considered acceptable for use in drill bits of the kind described.

Other suitable gap-filling settable liquids are epoxy resin, dental amalgam, tin/lead solder and bismuth/antimony alloy, e.g. comprising 95% bismuth, 5% antimony. Adhesives may be used which set at ambient temperature.

The advantages of this method are that consistent results can be achieved without excessively tight tolerances, that the adhesive film is in compression throughout the operating temperature range, and that the cutting structures do not experience a heating cycle as they would in a brazed assembly. If the assembly is to be dismantled, heating the adhesive to at least 250° C. and preferably 350° C. will cause it to break down and allow the cutting structure to be removed.

Although the above-mentioned joint strengths are considered to be sufficient, the assembly may be further strengthened by keying the stud against rotation.

It will be appreciated that the arrangement shown in the drawings is only one example of the many variations of the type of bit or cutting structure to which the invention is applicable. For example, the invention may also be applicable to cutting structures for use in matrix bodied bits. The invention is preferably applied to matrix bodied bits or hard-faced steel bodied bits in view of the risk of erosion of the bit body around the cutting structure weakening the adhesive joint.

It will also be appreciated that varations in the exemplary method described in detail above could be made within the spirit of the invention. More specifically, it is noted that, in the exemplary method described above, the filling of the clearance between the cutting structure and the socket with a settable liquid is performed simultaneously with the insertion of the cutting structure into the socket, since the settable liquid is applied to that cutting structure before it is inserted into the socket. However, it will be appreciated that, in some instances, e.g. when using a solder, the cutting structure might be placed in the socket first, whereafter the solder is emplaced in the clearance. In still other embodiments, it might be possible to insert the settable liquid in the socket first, then insert the cutting structure, with the latter displacing the settable liquid as necessary to fill the lateral gap. Accordingly, in the method claims which follow, recitation of steps in a given order is not intended to imply that the steps must be performed in that order, unless a particular step is preceded by specific qualifying language such as "first," "then," "next," or the like.

We claim:

1. A method of manufacturing a rotary drill bit of the kind comprising a bit body having a shank for connection to a drill string, a bit face on the bit body, a plurality of cutting structures mounted in sockets in the bit body and projecting from the face of the bit, and a number of openings in the face of the bit communicating with a passage in the bit body for supplying drilling fluid to the face of the bit, the method including the steps of dimensioning each cutting structure and the socket within which it is to be received to provide a clearance between the cutting structure and the socket, inserting the cutting structure in the socket, filling said clearance with a settable liquid, and then solidifying said liquid, the settable liquid solidifying at a temperature less than 400° C. and retaining its integrity, after solidification, at least up to a temperature of 180° C.

2. A method according to claim 1, wherein the settable liquid exhibits no shrinkage on solidification.

3. A method according to claim 1, wherein the settable liquid expands on solidification.

4. A method according to claim 1, wherein the settable liquid is an anaerobic adhesive.

5. A method according to claim 1, wherein the settable liquid is an epoxy resin.

6. A method according to claim 1, wherein the settable liquid is a dental amalgam.

7. A method according to claim 1, wherein the settable liquid is a tin/lead solder.

8. A method according to claim 1, wherein the settable liquid is a bismuth/antimony alloy.

9. A method according to claim 8, wherein the alloy comprises substantially 95% bismuth and substantially 5% antimony.

10. A method according to claim 1, including the further steps of heating the bit body to a temperature below that at which the settable liquid would break down, coating the portions of the cutting structure which are to be received into the sockets, at substantially ambient temperature, with the liquid, introducing the cutting structures into the sockets, and then allowing the bit body to cool to ambient temperature.

11. A method according to claim 10, wherein the bit body is heated to a temperature of the same order as the maximum temperature to which the bit will be subjected in normal use.

12. A method according to claim 1, wherein the cutting structures and sockets dimensioned to provide a clearance of substantially 0.1 mm between the cutting structure and the socket at ambient temperature.

13. A method according to claim 1, wherein the bit body is formed from machinable metal, the sockets being machined into the bit body.

14. A method according to claim 1, wherein the bit body is formed by a powder metallurgy process, the sockets being moulded into the bit body during the powder metallurgy process.

15. A method according to claim 1, wherein each cutting structure comprises a cutting element bonded to a carrier which is received in an associated socket in the bit body.

* * * * *